(12) United States Patent
Aponte et al.

(10) Patent No.: US 6,215,856 B1
(45) Date of Patent: Apr. 10, 2001

(54) DUAL MODE MONITOR MODULE

(75) Inventors: Luis A. Aponte, Andover; Mark Benda, Highland Lakes; David Stephen DeVincentis, Flanders, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/132,340

(22) Filed: Aug. 11, 1998

(51) Int. Cl.[7] ..................................................... H04M 1/24
(52) U.S. Cl. .................................. 379/29; 379/23; 379/26
(58) Field of Search .................................. 379/34, 35, 2, 379/29, 7, 23, 1, 27, 22, 26

(56) References Cited

U.S. PATENT DOCUMENTS

| | | | |
|---|---|---|---|
| 4,513,176 | * 4/1985 | Fostveit | 379/9 |
| 4,581,494 | * 4/1986 | Pickens | 379/27 |
| 4,756,017 | * 7/1988 | Bush | 379/23 |
| 5,553,116 | * 9/1996 | Avni | 379/35 |
| 5,742,665 | * 4/1998 | Chao | 379/35 |

* cited by examiner

Primary Examiner—Curtis Kuntz
Assistant Examiner—Binh K. Tieu
(74) Attorney, Agent, or Firm—Duane Morris & Heckscher LLP

(57) ABSTRACT

A method and apparatus for monitoring telecommunication lines. A switch is disposed between the telecommunication lines to be monitored and a jack which is connectable to a signal monitoring device. The switch is positionable into a neutral position for permitting connection of the signal monitoring device to the jack and at least a second position where the signal monitoring device may monitor the signals of the telecommunication lines.

12 Claims, 2 Drawing Sheets

DUAL MODE MONITOR MODULE

FIELD OF THE INVENTION

The present invention relates to electrical test equipment and more particularly to telecommunications test equipment.

BACKGROUND OF THE INVENTION

When troubleshooting telephone lines, it is desirable to monitor the signal on the line of interest without introducing noise or other spurious signals onto the line being monitored. Such monitoring has been performed in the past by placing a high impedance signal monitoring device across the line. This required gaining access to the line by, for example, electrically connecting some form of monitoring connector, such as a jack, across the line. The very act of inserting a monitor plug or similar connector into the jack, however, can diminish the accuracy of the monitoring process.

SUMMARY OF THE INVENTION

The present invention relates to apparatus for monitoring telecommunication signals on at least two telecommunication lines. The apparatus includes a jack having at least two terminals which are electrically connectable to a signal monitoring device. A switch having a neutral position and at least one operative position enables selective switching of the terminals of the jack from an electrically disconnected position with respect to the telecommunication lines to a position which electrically connects the terminals of the jack across selected ones of the telecommunication lines. The signal monitoring device is connected to the jack while the switch is in neutral position. Thereafter, the switch is moved to an operative position electrically linking the signal monitoring device to the telecommunication lines. The apparatus reduces spurious signals, spikes, noise and other distortion which occurs when a signal monitoring device is directly connected to a telecommunication line monitoring jack without an intervening switch mechanism. In addition, the apparatus permits signal monitoring of both incoming and outgoing telecommunications lines.

DETAILED DESCRIPTION OF THE INVENTION

Figure 1:
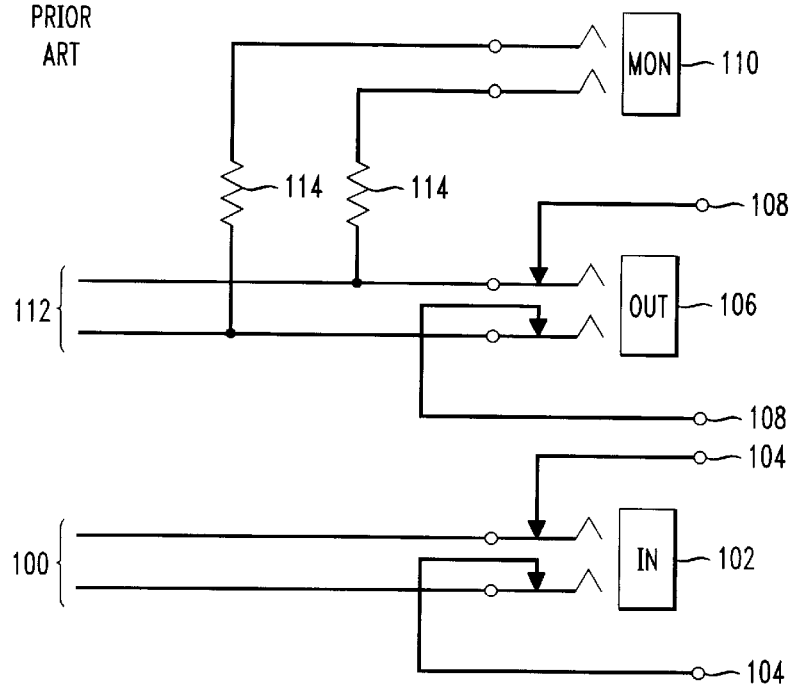
FIG. 1 is an electrical schematic of a prior art telecommunications monitoring apparatus.

As depicted schematically in FIG. 1, there is shown a typical arrangement for monitoring the output signal of telephone lines. An input signal may be applied to telecommunications input signal lines 100 at an input jack 102 or to input terminals 104 which are electrically connected to the input signal lines 100. The output signal appears at output jack 106 or at output terminals 108.

The output signal is normally monitored by inserting a plug, which is electrically connected to a signal monitoring device, not shown, into a monitor jack 110. The terminals of the monitoring jack 110 are electrically connected to telecommunications output signal lines 112 through a pair of resistors 114. Thus, in order to monitor the signal, a plug, which is electrically connected to the terminals of the monitoring device, is inserted into the jack which is electrically connected across the line. However, insertion of the plug into the jack can itself cause perturbations in the signal being monitored even though an attempt has been made to minimize such perturbations by use of the resistors 114.

Figure 2:
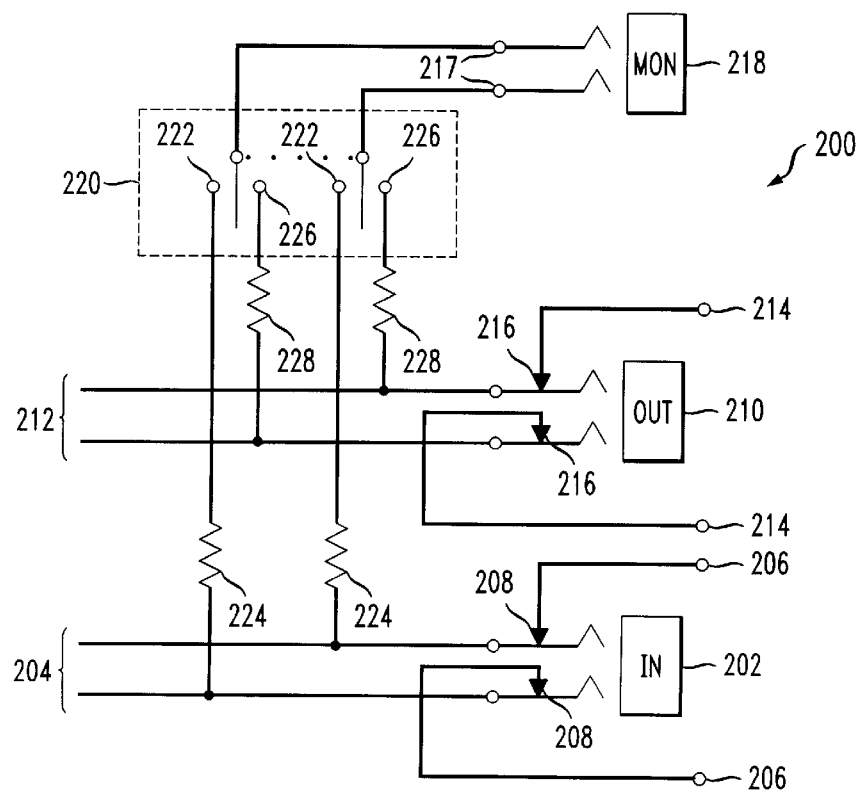
FIG. 2 is an electrical schematic of an embodiment of a telecommunications monitoring apparatus in accordance with the present invention.

Referring to FIG. 2, there is shown an electrical schematic of an apparatus according to the present invention for monitoring telecommunications signals, generally designated 200. The apparatus 200 includes an input jack 202 which is electrically connected to a pair of input signal lines 204. Input terminals 206 are also electrically connected to the input signal lines 204 through contacts 208 of the input jack 202. An output jack 210 is electrically connected to a pair of output signal lines 212. Output terminals 214 are also electrically connected to the output signal lines 212 through contacts 216 of the output jack 210. The terminals 217 of a monitor jack 218 are electrically connected to the poles of a double pole, double throw, DPDT, switch 220. The DPDT switch 220 has a neutral position as shown in FIG. 2. A first set of contacts 222 of the DPDT switch 220 are electrically connected to the input signal lines 204 through resistors 224. A second set of contacts 226 of the DPDT switch 220 are electrically connected to the output signal lines 212 through resistors 228.

An input signal is applied to input signal lines 204 by either inserting an input signal plug which is electrically connected to a signal source, not shown, into the input jack 202 or by applying the input signal to input terminals 206. These two different modes of applying the input signal are mutually exclusive since, as shown in FIG. 2, inserting the input signal plug into the input jack 202 will cause the contacts 208 to open thereby disconnecting the input terminals 206 from the input signal lines 204. The input signal is coupled to a network element, not shown, by the input signal lines 204. An output signal is coupled from the network element to the output jack 210 and the output terminals 214 by the output signal lines 212. The output signal is accessed at either the output terminals 214 or by an output signal plug, not shown, inserted into the output signal jack 210. These two different modes of accessing the output signal are mutually exclusive since, as shown in FIG. 2, inserting the output signal plug into the output jack 210 will cause the contacts 216 to open thereby disconnecting the output terminals 214 from the output signal lines 212.

The apparatus 200 operates as follows. A telecommunications signal is applied to the input signal lines 204 by either applying the signal directly to the input terminals 206 or by inserting a plug, which is electrically connected to the telecommunications signal source, into the input signal jack 202. The signal is coupled to a network element, not shown, by the input signal lines 204. An output signal from the network element is coupled to the output jack 210 and the output terminals 214 by the output signal lines 212. Either or both of the input signal and the output signal is monitored by inserting a plug, which is electrically connected to a signal monitoring device, not shown, into the monitor jack 218, preferably when the DPDT switch 220 is in the neutral position shown in FIG. 2.

To monitor the input signal, the DPDT switch 220 is switched to a first position whereby the terminals 217 of the monitor jack 218 are electrically connected to the input signal lines 204 through resistors 224. The resistors 224 minimize the effect on the input signal caused by connecting the monitoring device across the input signal lines 204 when the DPDT switch 220 is switched to the first switch position. To monitor the output signal, the DPDT switch 220 is switched to a second position whereby the terminals 217 of the monitor jack 218 are electrically connected to the output signal lines 212 through resistors 228. The resistors 228 minimize the effect on the output signal caused by connecting the monitoring device across the output signal lines 212 when the DPDT switch 220 is switched to the second switch position.

Thus, in order to monitor either the input signal or the output signal, the signal monitor plug, which is electrically connected to the monitoring device, is inserted into the monitor jack 218, and the DPDT switch 220, which is initially in the neutral position when the monitor plug is inserted into the monitor jack 218, is switched to either the first position, which electrically connects the terminals 217 of the monitor jack 218 across the input signal lines 204 through resistors 224, or the second position, which electrically connects the terminals 217 of the monitor jack 218 across the output signal lines 212 through resistors 228. Because the DPDT switch 220 is in the neutral position initially, insertion of the monitor plug into the monitor jack 218 will have no effect on either the input signal or the output signal.

Figure 3:
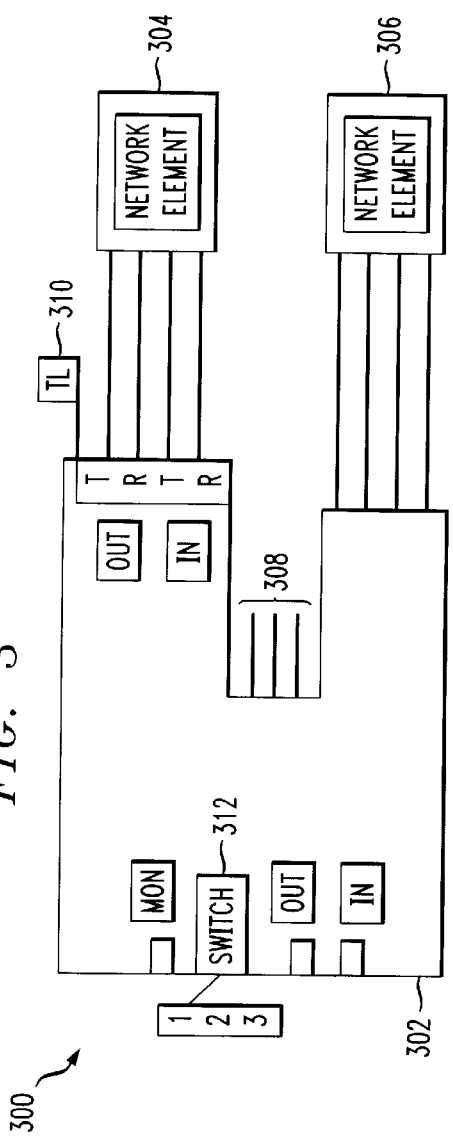
FIG. 3 is a schematic diagram of a system employing the apparatus depicted in FIG. 2 connected to two network elements.

Referring to FIG. 3, there is shown a telecommunications system 300 comprising a monitoring apparatus 302 linked to a first network element 304 and a second network element 306. Monitoring apparatus 302 is constructed substantially similar to apparatus 200 described above, and the first and second network elements 304,306 may include, without limitation, MUX (a multiplexer that combines several digital signals, for example, 28 DS1 signals, into a high bit-rate signal; for example, one DS3 signal, and vice versa), fiber terminal, (DACS) and the like. DACS is an electronic digital crossconnect system manufactured by Lucent Technologies Network Systems that has the capability to rearrange the digital signal components of a particular transmission rate. For example, the DACS I and II systems can rearrange the DSO components of DS1 signals, and the DACS IV-2000 can rearrange the DS1 components of a DS3 signal. The DACS III-2000 cross connects DS3 signals with no component rearrangement.

Monitoring apparatus 302 is powered and grounded by power and ground lines 308. Apparatus 302 connects the network elements 304, 306 such that the output signal of one network element (304 or 306) serves as the input signal of the other network element (304 or 306) wherein "T" and "R" respectively represent the tip and ring lines of the input and output signal lines. Additionally, monitoring apparatus 302 preferably includes a tracing lamp 310. The tracing lamp 310 may be a lamp or light-emitting diode (LED) located on the front or rear of the module that aids the craft in locating the two ends of a cross-connect or interconnect circuit.

By disposing the DPDT switch 312 from neutral position "2" to active positions "1"or "3", one may selectively monitor the coupled input and output signals of the first and second network elements 304, 306.

Figure 4:
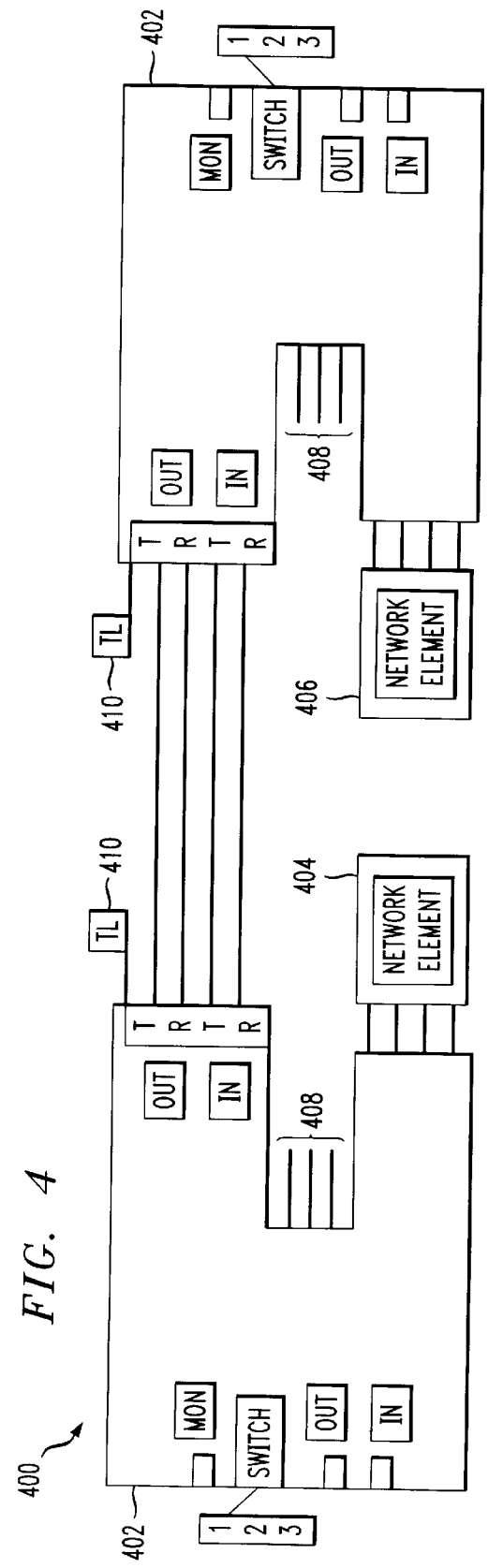
FIG. 4 is a schematic diagram of a further system employing a cross-connected pair of the apparatus depicted in FIG. 2 also connected to two network elements.

FIG. 4 illustrates a telecommunications system 400 comprising a pair of cross-connected monitoring apparatus 402. Apparatus 402 are constructed substantially similar for apparatus 200 and are serially linked to a first network element 404 and a second network element 406. Similar to system 300, the output signal of one network element (404 or 406) serves as the input signal of the other network element (404 or 406). Each network element 404, 406 is powered and grounded by power and ground lines 408 and each preferably includes a tracing lamp 410. Among the relative advantages provided by the architectures of systems 300 and 400 is that system 300, an "interconnect" system of termination, requires no additional wires and only one module to complete a circuit. The "cross-connect" system 400 requires that two modules be used to complete a circuit. However, a cross-connect system, unlike an interconnect system, allows identification of, and connection to, new and/or other types of equipment.

It should be understood that various changes in the details, materials and arrangement of the parts which have been described and illustrated in order to explain the nature of this invention may be made by those skilled in the art without departing from the principle and scope of the invention as described in the following claims.

What is claimed is:

1. A signal monitoring apparatus comprising:

a jack including at least two terminals and means for connecting said jack to a signal monitoring device; and a switch including at least two contacts connected to at least two signal carrying lines, said at least two contacts being selectively connectable to said at least two terminals of the jack, said switch being positionable into a first position where said at least two terminals of the jack are electrically disconnected from said at least two contacts of the switch, and a second position wherein said at least two terminals of the jack are electrically connected to said at least two contacts of the switch, whereby, when said switch is in said first position, a signal monitoring device is connectable to said jack, and, when said switch is in said second position, electrical connection is established between said signal carrying lines and a signal monitoring device when a signal monitoring device is connected to said jack while said switch is in said first position, and wherein said switch includes at least two additional contacts connected to at least two additional signal carrying lines, said switch being further positionable into a third position wherein said at least two terminals of the jack are electrically connected to said at least two additional switch contacts, whereby, when said switch is in said third position, electrical connection is established between said additional signal carrying lines and a signal monitoring device when a signal monitoring device is connected to said jack while said switch is in said first position.

2. The signal monitoring apparatus as defined in claim 1 wherein said switch is a double pole, double throw switch.

3. The signal monitoring apparatus as defined in claim 1 wherein said at least two signal carrying lines are telecommunication lines.

4. The signal monitoring apparatus as defined in claim 3 wherein said telecommunication lines are input signal lines.

5. The signal monitoring apparatus as defined in claim 3 wherein said telecommunication lines are output signal lines.

6. The signal monitoring apparatus as defined in claim 1 wherein said at least two signal carrying lines and said at least two additional signal carrying lines are telecommunication lines.

7. The signal monitoring apparatus as defined in claim 6 wherein said at least two signal carrying lines are input telecommunication lines and said at least the additional signal carrying lines are output telecommunication lines.

8. The signal monitoring apparatus as defined in claim 1 further comprising resistors disposed between said at least two contacts and said at least two signal carrying lines.

9. The signal monitoring apparatus as defined in claim 1 further comprising resistors disposed between said at least two contacts and said at least two signal carrying lines and between said at least two additional contacts and said at least two additional signal carrying lines.

10. A method for monitoring the signal of at least two telecommunication lines, said method comprising the steps of:
- connecting two contacts of a switch to two telecommunication lines;
- connecting a jack to said switch, said jack being adapted for connection to a signal monitoring device and including two terminals adapted for electrical contact with said two contacts;
- disposing said switch into a position whereby said terminals are electrically disconnected from said contacts;
- connecting a signal monitoring device to said jack;
- disposing said switch into a position whereby said terminals are electrically connected to said contacts;
- monitoring said telecommunication lines using said signal monitoring device;
- connecting two additional contacts of said switch to two additional telecommunication lines;
- after connecting said signal monitoring device to said jack, disposing said switch into a position whereby said terminals are connected to said additional contacts; and
- monitoring said additional telecommunication lines using said signal monitoring device.

11. A signal monitoring apparatus comprising:
- a monitor jack including at least two terminals and means for connecting said jack to a signal monitoring device; and
- a switch including at least two contacts connected to at least two signal carrying lines, said at least two contacts being selectively connectable to said at least two terminals of the monitor jack, said switch being positionable into a first position where said at least two terminals of the monitor jack are electrically disconnected from said at least two contacts of the switch, and a second position wherein said at least two terminals of the monitor jack are electrically connected to said at least two contacts of the switch,
- whereby, when said switch is in said first position, a signal monitoring device may be connected to said monitor jack, and, when said switch is in said second position, a signal monitoring device may not be connected to said monitor jack, to ensure that connection of the signal monitoring device will have no effect on signals propagated on said signal carrying lines, and,
- whereby when said switch is in said second position after a signal monitoring device is connected to the monitor jack when the switch is in said first position, electrical connection is established between said signal carrying lines and a signal monitoring device, and
- wherein said switch includes at least two additional contacts connected to at least two additional signal carrying lines, said switch being further positionable into a third position wherein said at least two terminals of the jack are electrically connected to said at least two additional switch contacts, whereby, when said switch is in said third position, electrical connection is established between said additional signal carrying lines and a signal monitoring device when a signal monitoring device is connected to said jack while said switch is in said first position.

12. The signal monitoring apparatus of claim 11, wherein said switch is a double pole, double throw switch.

* * * * *